United States Patent
Uhrick et al.

(10) Patent No.: US 10,247,245 B2
(45) Date of Patent: Apr. 2, 2019

(54) BEVEL FACESPLINE WITH LINE CONTACT

(71) Applicant: FORD GLOBAL TECHNOLOGIES, LLC, Dearborn, MI (US)

(72) Inventors: Wayne Uhrick, Macomb, MI (US);
Dennis William Isken, II, Frankenmuth, MI (US); Nathan Wieseler, Beverly Hills, MI (US); Kevin Brooks, Clinton Township, MI (US); Djamel Bouzit, Ann Arbor, MI (US); Benjamin Graves, Redford Charter Township, MI (US); Mark Weston, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 813 days.

(21) Appl. No.: 14/936,801

(22) Filed: Nov. 10, 2015

(65) Prior Publication Data
US 2017/0130776 A1   May 11, 2017

(51) Int. Cl.
*F16D 1/076* (2006.01)
*F16D 1/10* (2006.01)
(Continued)

(52) U.S. Cl.
CPC ............. *F16D 1/10* (2013.01); *F16C 3/02* (2013.01); *F16D 1/02* (2013.01); *F16D 1/076* (2013.01);
(Continued)

(58) Field of Classification Search
CPC .......... F16D 1/076; F16D 1/072; F16D 1/033; B60B 27/0031; B60B 27/0036; B60B 27/0042; B60B 27/0084; B60B 35/128; B60B 35/127; B60B 35/12; B60B 35/122; F16C 19/186
See application file for complete search history.

(56) References Cited

U.S. PATENT DOCUMENTS

| 4,460,058 A * | 7/1984 | Welschof ............ B60B 27/0005 180/258 |
| 5,499,884 A | 3/1996 | Kuhnhold et al. |

(Continued)

OTHER PUBLICATIONS

News Release, GKN Driveline launches its Face Spline Innovation for CVJ Sideshafts, IAA, Frankfurt, Sep. 16, 2009.

*Primary Examiner* — Daniel J Wiley
(74) *Attorney, Agent, or Firm* — David Kelley; Brooks Kushman P.C.

(57) ABSTRACT

A halfshaft assembly in a vehicle is disclosed. The halfshaft assembly includes a hub and a mating universal joint, such as a constant-velocity joint. The hub has a plurality of hub-teeth arranged annularly about an axis. The constant-velocity joint has a plurality of joint-teeth arranged annularly about the axis and engaged with the hub-teeth. Between each joint-tooth is a joint-root. The top, outermost surface of each tooth facing away from adjacent roots extends at a first angle with respect to the central axis. The root extends at a second angle with respect to the central axis. The angles are different such that the height of the tooth varies along the same tooth along the length of the tooth. Each tooth has involute side surfaces. The joint-teeth form a conical or inverse-conical shape.

17 Claims, 5 Drawing Sheets

(51) Int. Cl.
*F16C 3/02* (2006.01)
*F16D 1/02* (2006.01)
*F16D 3/223* (2011.01)

(52) U.S. Cl.
CPC ........ *F16D 3/223* (2013.01); *F16D 2001/103* (2013.01); *F16D 2003/22326* (2013.01); *F16D 2300/12* (2013.01)

(56) References Cited

U.S. PATENT DOCUMENTS

| | | | |
|---|---|---|---|
| 5,613,914 A | 3/1997 | Gleasman et al. | |
| 8,327,967 B2 | 12/2012 | Schapf | |
| 8,444,322 B2 | 5/2013 | Langer et al. | |
| 2010/0285891 A1* | 11/2010 | Wormsbaecher | F16D 1/033 464/139 |
| 2011/0123264 A1* | 5/2011 | Wang | F16D 1/033 403/359.6 |
| 2011/0285196 A1* | 11/2011 | Kamikawa | B60B 27/0005 301/105.1 |
| 2013/0053155 A1 | 2/2013 | Watanabe et al. | |
| 2013/0333503 A1 | 12/2013 | Peura et al. | |

* cited by examiner

BEVEL FACESPLINE WITH LINE CONTACT

TECHNICAL FIELD

This disclosure relates to a spline connection between torque-carrying components within a vehicle.

BACKGROUND

Spline connections are known in the art. Spline connections include ridges or teeth that mesh with grooves in a mating piece. Torque transfers through the two mating components through the spline connection. A typical location for a spline connection is on a drive shaft.

SUMMARY

According to one embodiment, a vehicular shaft assembly, such as a driveshaft or a halfshaft assembly, is provided. A hub has a hub face defining an annular array of hub-teeth disposed about a hub axis. A universal joint, such as a constant-velocity joint, has a joint face engaged with the hug face. The joint face defines an annular array of joint-teeth about a joint axis. Each joint-tooth has beveled side surfaces and inclines away from the hub face as a distance from the axis increases. This can provide the joint face with a conical shape, for example.

Each joint-tooth may include a length and an upper surface extending along the length. The joint face may define a root surface between each joint-tooth. The upper surfaces may define a first angle with the joint axis and the root surfaces may define a second angle with the joint axis that differs from the first angle.

The universal joint may define an inner radius and an outer radius with each joint-tooth extending between the inner radius and the outer radius. Each joint tooth may include a base and an upper surface defining a tooth-height therebetween. Each joint-tooth may have a first tooth-height at the inner radius and a second tooth-height at the outer radius that exceeds the first tooth-height.

The joint-teeth and hub-teeth each may include upper surfaces connecting a pair of side surfaces extending along a length of a respective tooth. The joint-teeth may engage the hub-teeth along a contact line that extends along the length of the side surfaces of the joint-teeth and hub-teeth.

According to another embodiment, a vehicle comprises a hub and a constant-velocity joint. The hub has a plurality of hub-teeth arranged annularly about an axis. The constant-velocity joint has a plurality of joint-teeth arranged annularly about the axis and engaged with the hub-teeth. Each joint-tooth has an upper surface extending away from the axis at a first angle. The constant-velocity joint further defines a joint-root between each joint-tooth extending away from the axis at a second angle that is different than the first angle.

According to yet another embodiment, a halfshaft assembly comprises a face spline including a base and a plurality of teeth extending from the base and arranged about an axis. Each tooth has a respective upper surface separated from the base by a tooth-height and a pair of involute side surfaces. The tooth-height increases along the spline in a direction away from the axis.

The plurality of teeth collectively define a periphery, and each upper surface can incline from the central axis toward the periphery in a direction toward the base. This gives a conical shape of the face spline. In another embodiment, the plurality of teeth collectively define a periphery, and each upper surface can incline from the central axis toward the periphery in a direction away from the base. This gives an inverse-conical shape of the face spline.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

According to various embodiments of the present disclosure, a face-spline connection at a halfshaft is described. The face-spline connection can be for the interface between a universal joint, such as a constant-velocity joint, and an associated hub connected thereto. As will be described below, the face-spline connection includes teeth with beveled or rounded surfaces, in which the teeth of each connected part of the face-spline connection form a conical or inverse-conical shape (or, more particularly, a frustoconical or inverse-frustoconical shape). Moreover, the height of each individual tooth varies along the length of the tooth. The combination of these structure components, along with additional structure described below, provide a smaller contact point or line between mating teeth while allowing for improved tolerance between teeth.

Figure 1:
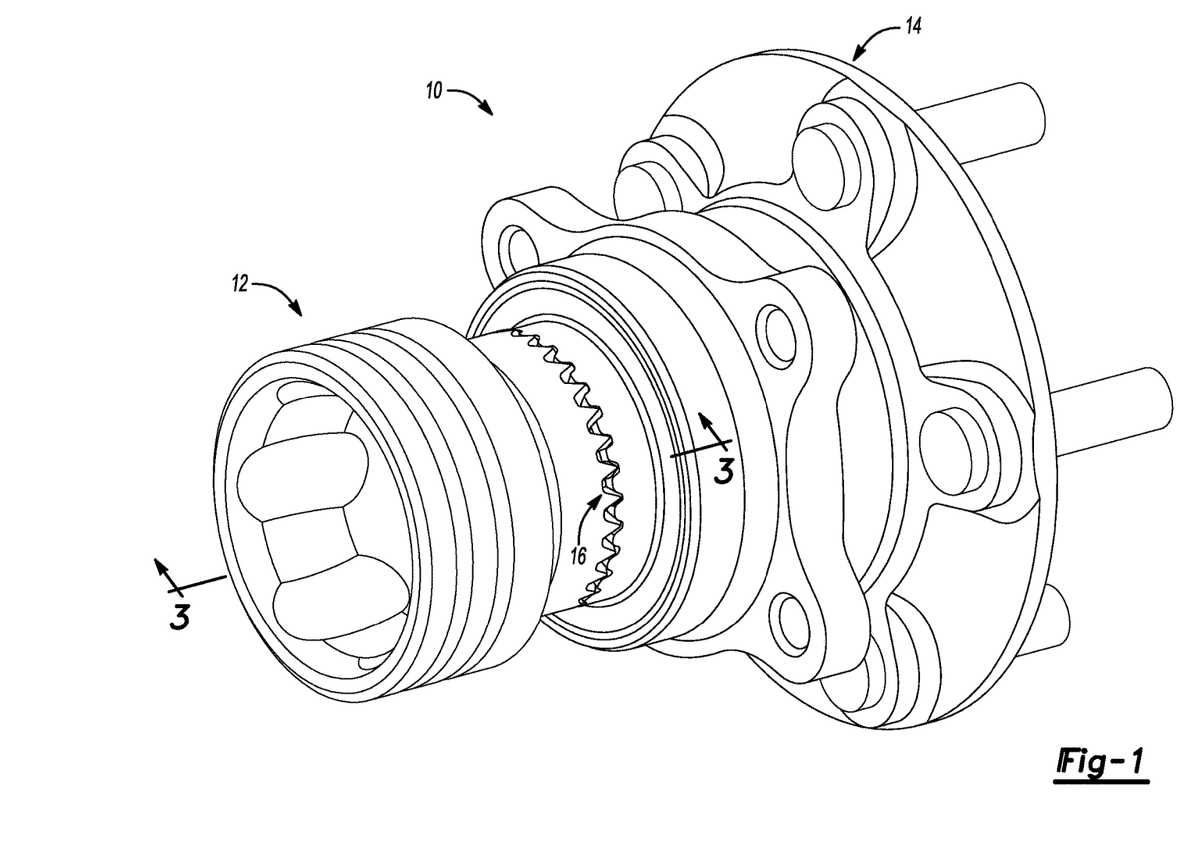
FIG. 1 is a perspective view of a halfshaft assembly according to one embodiment.
Figure 2:
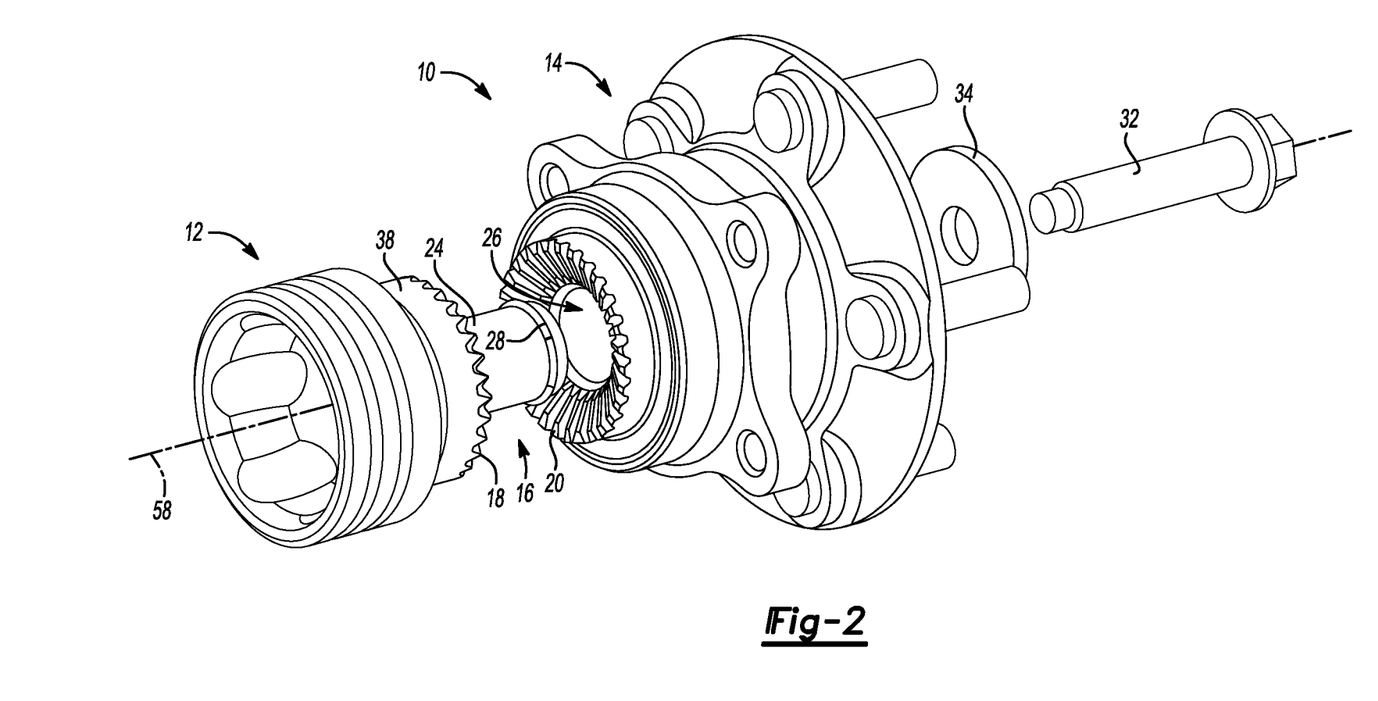
FIG. 2 is an exploded perspective view of the halfshaft assembly according to one embodiment.
Figure 3:
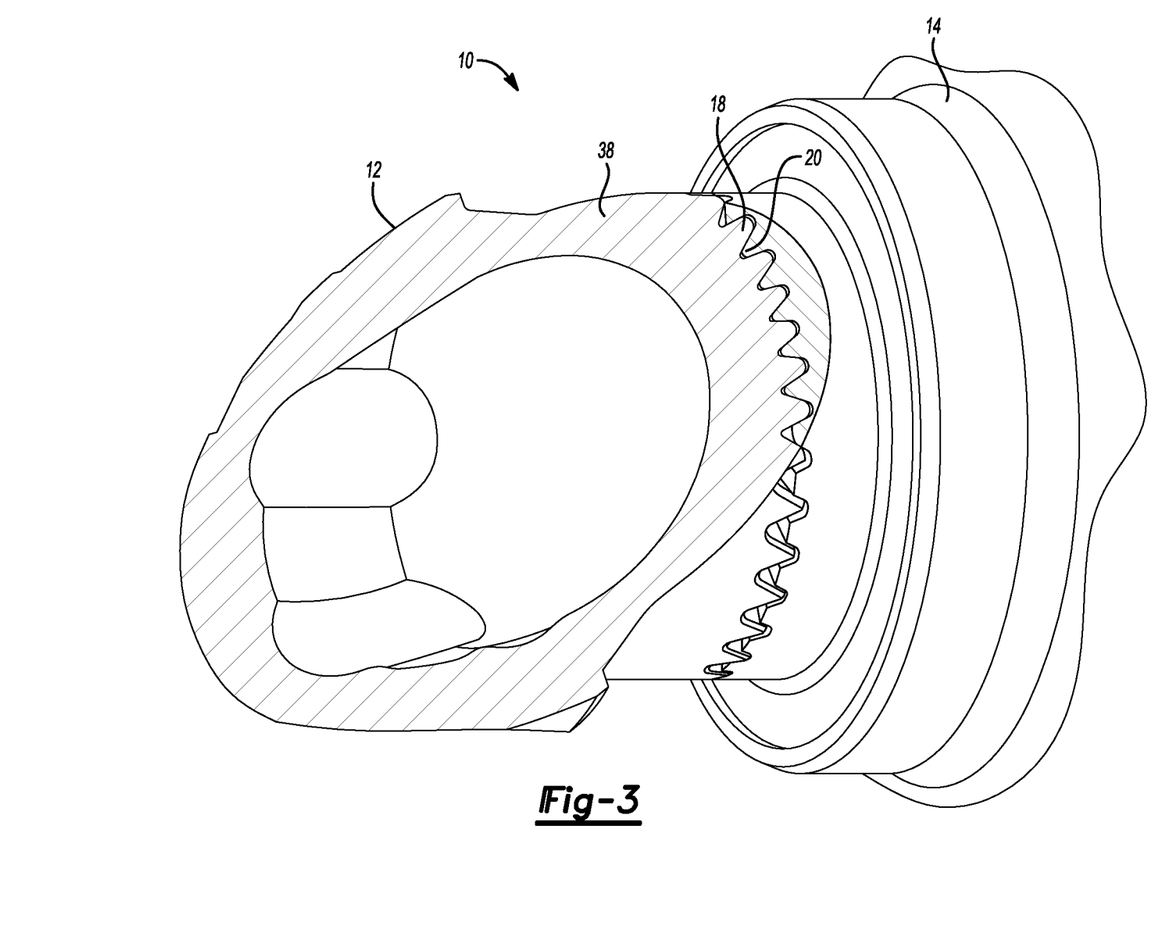
FIG. 3 is an angled cross-sectional view of a portion of the halfshaft assembly taken along the line 3-3 of FIG. 1.

FIG. 1 illustrates one embodiment of an assembled halfshaft assembly according to one embodiment, while FIG. 2 illustrates the halfshaft assembly in an exploded, disassembled view. FIG. 3 illustrates an angled cross-sectional view taken along line 3-3 of FIG. 1. Referring to FIGS. 1-3, the halfshaft assembly 10 includes a universal joint, such as a constant-velocity joint 12, which is engaged with a hub 14. The constant-velocity joint 12 and the hub 14 engage one another at a spline connection 16. As will be described in more detail below, the constant-velocity joint 12 includes a joint face defining joint-teeth, or teeth 18, and the hub 14 includes a hub face defining hub-teeth, or teeth 20. The hub-teeth can be wheel hub face splines, or simply "hub-teeth." The joint-teeth are constant velocity joint tulip spline teeth, or simply "joint-teeth" or "teeth." The teeth 18, 20 are annularly arranged and spaced about a central axis. The teeth 18, 20 meshingly engage to provide the spline connection, allowing the constant-velocity joint 12 and the hub 14 to rotate together along the halfshaft.

Referring to FIG. 2, the constant-velocity joint 12 includes a cylindrical stem 24 extending along the central axis. The stem 24 is received within a hub bore 26. A retaining ring 28 may be situated on the stem 24 which expands into corresponding grooves within the hub bore 26 when the stem 24 is inserted into the bore 26. This provides a temporary engagement of the constant-velocity joint 12 with the hub 14 to enable a technician or assembly line worker to finalize assembly. To finalize assembly of the halfshaft assembly 10, a fastener such as bolt 32 can pass through a corresponding washer 34 and a bolt hole 36 (FIG. 4) defined within the constant-velocity joint 12.

According to various embodiments, and as will be further described below, the teeth 18 of the constant-velocity joint 12 take the general shape of a cone. In particular, the teeth 18 may extend from an inner radius (e.g., the outer circumference of the stem 24) to an outer radius where the teeth end. The teeth 18 slope or incline away from the hub 14 from the inner radius toward the outer radius. This gives the mating face of the constant-velocity joint 12 a conical shape.

To mate with the constant-velocity joint 12, the teeth 20 of the hub 14 take the general shape of an inverse-cone. In particular, the teeth 20 may extend from an inner radius (e.g., the circumference of bore 26) to an outer radius where the teeth end. The teeth 20 slope or incline toward the constant-velocity joint 12 from the inner radius toward the outer radius. This gives the mating face of the hub 14 an inverse-conical shape.

It should be understood that this disclosure should not be limited to the constant-velocity joint 12 being conically shaped and the hub 14 being inverse-conically shaped. In another embodiment, the shapes are reversed such that the constant-velocity joint 12 is inverse-conically shaped and the hub 14 is conically shaped.

In combination with the conical and inverse-conical shapes of the constant-velocity joint 12 and the hub 14, the teeth 18, 20 of each can have varying height. This is further described with reference to FIG. 4A below. In one particular embodiment, each tooth 18 of the constant-velocity joint 12 extends from the inner radius (e.g., the outer circumference of the stem 24) to the outer radius where the teeth 18 end. Each tooth 18 extends from a base 38 of the constant-velocity joint 12 to define a first height at the inner radius and a second height at the outer radius. The second height exceeds the first height, such that the height of the tooth increases as the tooth extends in a direction away from the central axis. The corresponding teeth 20 on the hub 14 can include similar varying heights and depths of the roots between the teeth 20. These varying heights, in combination with the conical and inverse-conical shape of the constant-velocity joint 12 and hub 14, provide the spline connection with a minimal line contact between engaging teeth that extends along the length of the side surfaces of the teeth.

Figure 4:
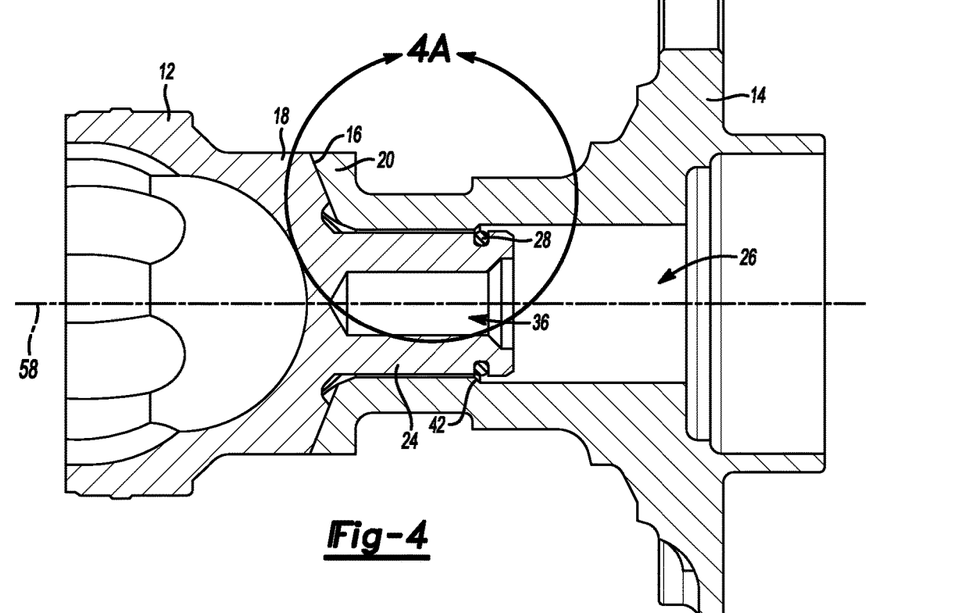
FIG. 4 is a cross-sectional view of a portion of the halfshaft assembly in which a constant-velocity joint engages with a hub, according to one embodiment.

Referring to FIG. 4, a cross-sectional view of the spline connection between the constant-velocity joint 12 and the hub 14 is illustrated. The stem 24 is received within the hub bore 26. The retainer ring 28, initially sitting in a corresponding annular groove in the stem 24 prior to assembly, has now expanded to be received by a corresponding groove or retaining surface 42. The retaining surface 42 contacts the retainer ring 28 to inhibit the stem 24 from being pulled out of the hub bore 26.

The spline connection 16 is also illustrated in FIG. 4. As illustrated, the teeth 18 of the constant-velocity joint 12 slope or incline away from the hub 14 as the radius increases (i.e., as the distance from the central axis increases). This provides the constant-velocity joint 12 with a conical profile. Because each tooth is beveled and includes involute side surfaces as will be described below, the teeth 18 of the constant-velocity joint 12 engage the hub along a contact line that also slopes away from the hub as the distance from the central axis increases.

Figure 4A:
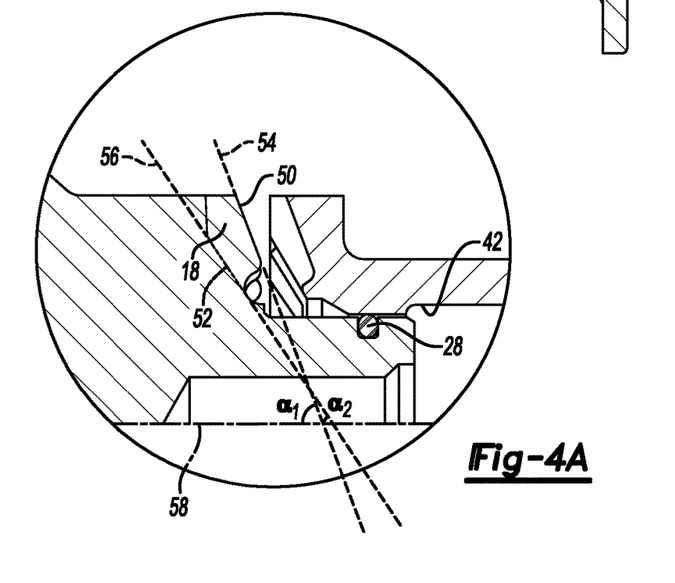
FIG. 4A is an enlarged exploded view of the cross-sectional view labeled in FIG. 4.

The view and embodiment shown in FIG. 4A illustrates length of the top surfaces of the teeth extending in a different direction than the length of the roots between the teeth. More particularly, each tooth 18 of the constant-velocity joint 12 has a top surface 50 that faces toward the hub 14. The term "top" is intended to refer to the surface of each tooth that faces the hub and away from the base 38. These top surfaces 50 do not contact the hub, but are received within corresponding roots of the splineface of the hub 14.

Between each tooth 18 is a root 52 defining a root surface. The root 52 is a valley or groove that separates the individual teeth 18 of the constant-velocity joint 12. The roots 52 do not contact corresponding teeth 20 of the hub 14, but provide a gap or void between the teeth 18 for the teeth 20 to fit.

As best shown in FIG. 4A, the top surface extends along a top-surface axis 54 while the root surface of the root 52 extends along a root-axis 56. The top-surface axis 54 intersects with the central axis 58 of the assembly 10 at a first angle $\alpha_1$ on the constant-velocity-joint side of the intersection. The root-axis 56 intersects with the central axis 58 but a second angle $\alpha_2$ on the constant-velocity-joint side of the intersection. The angles $\alpha_1$ and $\alpha_2$ are different, and in the embodiment shown in FIG. 4A, $\alpha_1$ exceeds $\alpha_2$. By having different angles, this creates a height of the teeth that varies. A height of the teeth is defined by a distance between the high point of the tooth 18 and the low point of the root 52 along the same radial distance from the central axis 58. Because $\alpha_1$ exceeds $\alpha_2$, the height of the teeth 18 increases as the length of the tooth increases from the axis outward.

It should be understood that this description regarding angular orientation is merely one embodiment. Other embodiments are contemplated in which the height of the teeth decrease as the radial distance increases from the central axis. And, of course, the same teachings and references to the teeth of the constant-velocity joint 12 can apply to the teeth of the hub 14.

Figure 5:
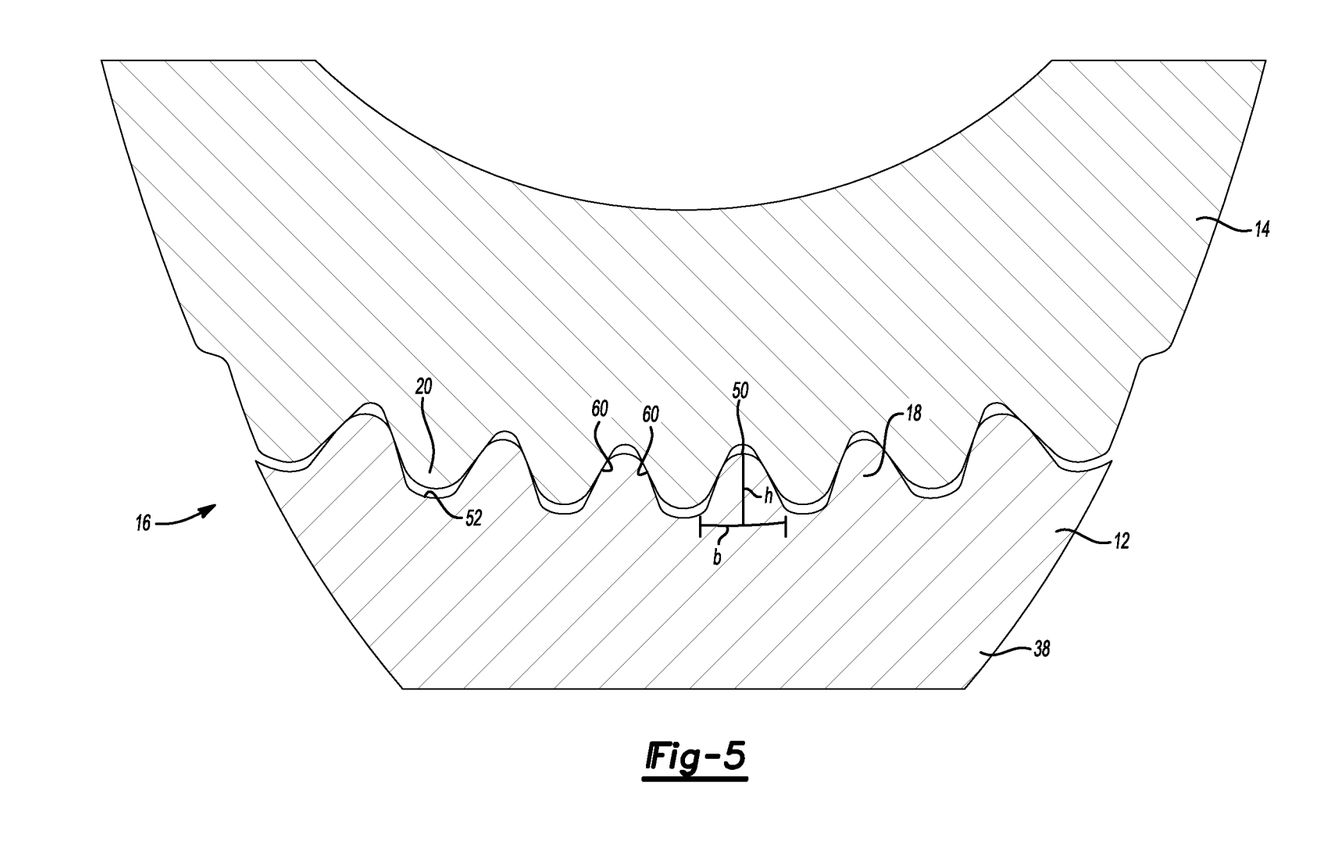
FIG. 5 is an enlarged cross-sectional view of the spline connection of the halfshaft assembly, according to one embodiment.

FIG. 5 illustrates a cross-section of an intersecting region between the teeth 18 of the constant-velocity joint 12 and the teeth 20 of the hub 14. Each tooth defines a top surface 50 and a root 52 defined by a root surface. The top surface 50 is spaced apart from a base "b" by a height "h". Extending radially inward from the top surface 50 are a pair of involute or curved side surfaces 60. These side surfaces 60 have curvature to maintain the line of contact between meshing teeth along central regions of the constant-velocity joint 12 and the hub 14. The teeth engage along a contact line extending along the length of the teeth, rather than a substantial face-to-face engagement.

As explained with reference to FIG. 4A, the height "h" of each tooth can vary as the length of the tooth increases from the central axis outward. For example, the height "h"

increases as the length of the tooth increases in a direction away from the central axis 58 due to the different angles $\alpha_1$ exceeds $\alpha_2$.

In one embodiment, $\alpha_1$ is 80 degrees, and $\alpha_2$ is 60 degrees. This 20 degree difference is but one example, but provides a structurally-noticeable change in height of the teeth 18.

In various embodiments described above, the teeth have varying height due to the difference in the root angle and the top-surface angle compared to the central axis. One of the constant-velocity joint and the hub is conical in shape, and the other is inverse-conical in shape. The side surfaces of each tooth are involute. All of these features combine to provide a small, singular point of contact along any cross-section of engaging teeth. The teeth contact along a line extending along the length of the engaging teeth. This line of contact provides reduces surface area of contact when compared to a face-to-face contact. A smaller contact area provides improved force application and torque transfer through the spline connection and the halfshaft. This line of contact also allows for compensation of manufacturing variability between the teeth and the corresponding roots that the teeth are received within.

It should be understood that while references are made herein to a halfshaft assembly, the teachings of the spline connection of this disclosure should not be limited to only halfshaft applications. Other regions of the powertrain in which spline connections are utilized can implement the teachings of this disclosure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicular shaft assembly, comprising:
a hub having a hub face defining an annular array of hub-teeth disposed about a hub axis; and
a universal joint having a joint face engaged with the hub face, the joint face defining an annular array of joint-teeth about a joint axis, each joint-tooth having beveled side surfaces and inclining away from the hub face as a distance from the hub axis increases, wherein each joint-tooth includes a length and an upper surface extending along the length, and the joint face defines a root surface between each joint-tooth, and wherein the upper surfaces define a first angle with the joint axis and the root surfaces define a second angle with the joint axis that differs from the first angle.

2. The vehicular shaft assembly of claim 1, wherein the universal joint defines an inner radius and an outer radius with each joint-tooth extending between the inner radius and the outer radius, each joint tooth includes a base and an upper surface defining a tooth-height therebetween, and each joint-tooth has a first tooth-height at the inner radius and a second tooth-height at the outer radius that exceeds the first tooth-height.

3. The vehicular shaft assembly of claim 1, wherein each of the upper surfaces connect a pair of side surfaces extending along a length of a respective tooth, and wherein the joint-teeth engage the hub-teeth along a contact line that extends along the length of the side surfaces of the joint-teeth and hub-teeth.

4. The vehicular shaft assembly of claim 1, wherein the joint-teeth and hub-teeth each include a pair of involute side surfaces extending along a length.

5. The vehicular shaft assembly of claim 1, wherein the hub-teeth each include side surfaces, wherein the side surfaces of the joint-teeth engage the side surfaces of the hub-teeth along a contact line that extends along a length of the joint-teeth and the hub-teeth.

6. The vehicular shaft assembly of claim 1, wherein the joint-teeth each have a base having a first width, and an upper surface having a second width, wherein the first width exceeds the second width.

7. The vehicular shaft assembly of claim 1, wherein the joint face is conically shaped and the hub face is inverse-conically shaped.

8. A vehicle comprising:
a hub having a plurality of hub-teeth arranged annularly about an axis; and
a constant-velocity joint having a plurality of joint-teeth arranged annularly about the axis that are inclined away from the hub as a distance from the axis increases and are engaged with the hub-teeth, each joint-tooth having an upper surface extending away from the axis at a first angle, the constant-velocity joint further defining a joint-root between each joint-tooth extending away from the axis at a second angle that is different than the first angle.

9. The vehicle of claim 8, wherein the upper surface of each joint-tooth is spaced from a base by a tooth-height, wherein the tooth-height increases in a direction radially-outward from the axis.

10. The vehicle of claim 9, wherein each joint-tooth includes a pair of involute side surfaces extending between the upper surface and the base.

11. The vehicle of claim 8, wherein the constant-velocity joint defines an inner radius and an outer radius with each joint-tooth extending between the inner radius and the outer radius, each joint-tooth includes a base and an upper surface defining a tooth-height therebetween, and each joint-tooth has a first tooth-height at the inner radius and a second tooth-height at the outer radius that exceeds the first tooth-height.

12. The vehicle of claim 8, wherein the constant-velocity joint includes a joint-face defining the joint-teeth, wherein the joint-face is conically shaped.

13. The vehicle of claim 8, wherein the hub includes a hub-face defining the hub-teeth, wherein the hub-face is conically shaped.

14. A halfshaft assembly comprising:
a face spline located on a face of a constant-velocity joint that mates with a corresponding hub, the face spline including a base and a plurality of teeth extending from the base and arranged about an axis, each tooth having a respective upper surface and a root surface separated by a tooth-height defined by a pair of involute side surfaces, wherein the tooth-height increases along the spline in a direction away from the axis and away from the hub, wherein:

the upper surfaces defines a first angle with the axis,
the root surfaces define a second angle with the axis,
and the first angle differs from the second angle.

15. The halfshaft assembly of claim 14, wherein the plurality of teeth collectively define a periphery, and wherein each upper surface is inclined from the axis toward the periphery in a direction toward the base.

16. The halfshaft assembly of claim 14, wherein the plurality of teeth collectively define a periphery, and wherein each upper surface is inclined from the axis toward the periphery in a direction away from the base.

17. The halfshaft assembly of claim 14, wherein the upper surfaces connect a pair of side surfaces extending along a length of each tooth, and the teeth engage corresponding teeth of the hub along a contact line that extends along the length of the side surfaces of the teeth.

\* \* \* \* \*